Sept. 16, 1941.   F. P. NOFFSINGER ET AL   2,256,125
GRASSHOPPER EXTERMINATOR
Filed Sept. 1, 1939
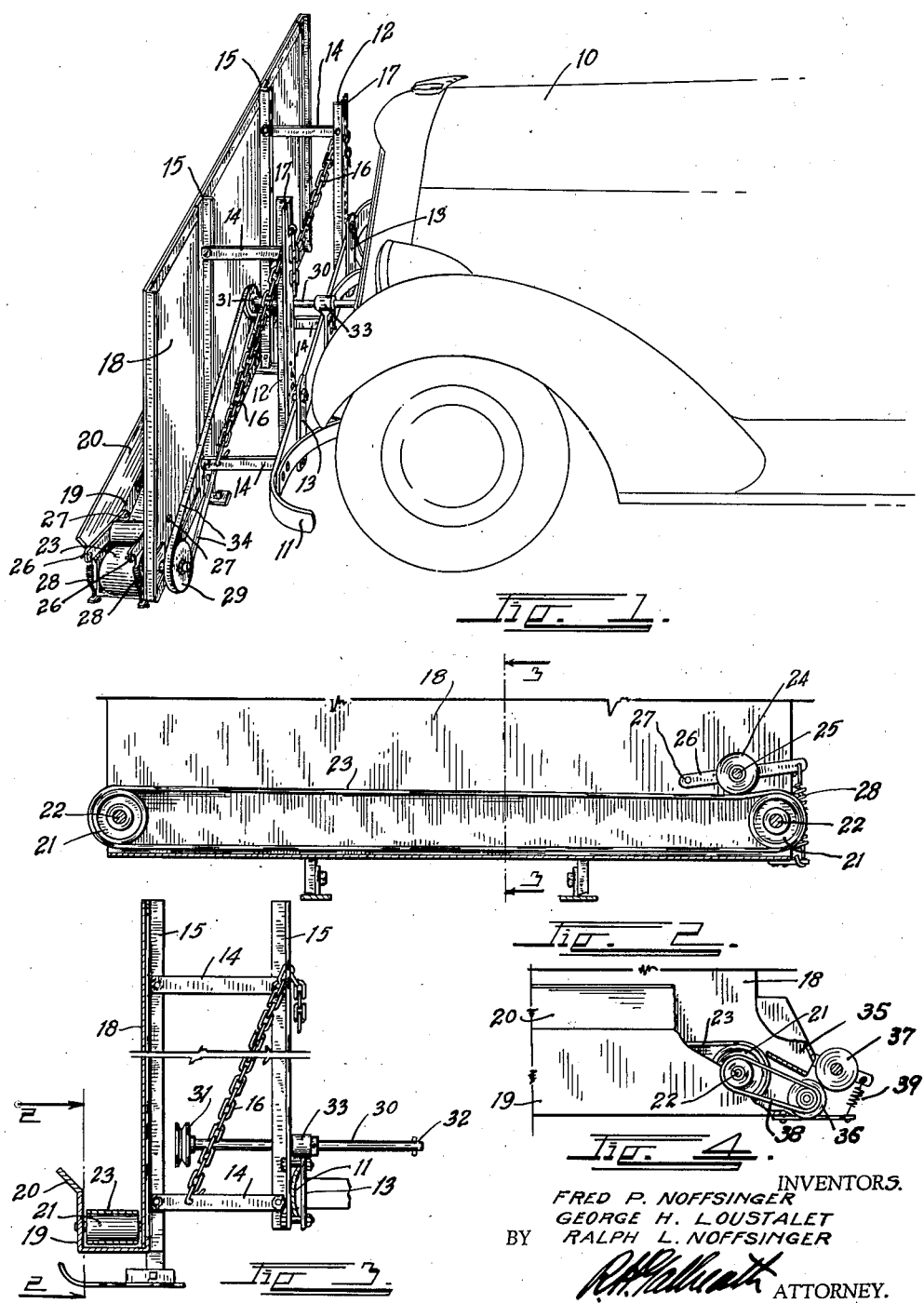
INVENTORS.
FRED P. NOFFSINGER
GEORGE H. LOUSTALET
BY   RALPH L. NOFFSINGER
ATTORNEY.

Patented Sept. 16, 1941

2,256,125

UNITED STATES PATENT OFFICE 2,256,125

GRASSHOPPER EXTERMINATOR

Fred P. Noffsinger, Ralph L. Noffsinger, and George H. Loustalet, Greeley, Colo.

Application September 1, 1939, Serial No. 293,024

2 Claims. (Cl. 43—138)

This invention relates to a grasshopper destroyer and has for its principal object the provision of a light, compact, efficient, portable device which can be attached to the front of any automobile, mower, or tractor and which, when driven over a field will catch, crush, and deposit the crushed grasshoppers upon the field.

Other objects of the invention are to provide a device of this character which will not require a separate source of power; which can be instantly connected with the engine of the automobile or tractor; and which can be readily adjusted as to height above the ground without effecting its vertical position or its operation.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 illustrates the improved grasshopper destroyer in place upon an automobile.

Fig. 2 is a longitudinal section therethrough taken on the line 2—2, Fig. 3.

Fig. 3 is a cross section therethrough taken on the line 3—3, Fig. 2.

Fig. 4 is a fragmentary detail view of an alternate arrangement of the crushing mechanism.

In the drawing, a typical automobile is indicated at 10 with its front bumper at 11.

The improved destroyer is attached to the automobile 10 by clamping two up-right standards 12 to the front bumper 11 by means of suitable clamp plates 13. The standards 12 are connected, by means of parallel hinge links 14, to a pair of vertical frame members 15 which are supported by means of diagonally placed chains 16 extending from a position adjacent the bottom of the frame members 15 to a position adjacent the top of the standards 12. The effective length of the chains 16 is adjustable by varying the position of the links thereof in vertical slots 17 in the top of the standards.

The frame members 15 are permanently secured to and act as a support for a metal back plate 18 of a length sufficient to extend outwardly beyond both sides of the path of the automobile.

A metal trough 19 is secured along the bottom edge of the back plate 18 and extends forwardly therefrom to an inclined side 20. At the extremities of the trough 19 are flat belt pulleys 21 mounted upon pulley shafts 22. A flat, flexible, endless belt 23 extends about the pulleys 21.

A crushing roller 24 is mounted upon an idler shaft 25 journalled in and extending between hinged supporting levers 26. The levers 26 are pivoted to the back plate 18 and to the side of the trough 19 upon suitable pivot bolts or rivets 27. The free extremities of the levers 26 are constantly pulled downwardly by means of tension springs 28 so that the crushing roller is constantly and firmly pressed against the belt 23.

The shaft 22 of one of the pulleys 21 is extended rearwardly of the back plate and provided with a V-belt pulley 29. A stub shaft 30 carrying a V-belt pulley 31 is furnished with the device. The stub shaft terminates in a key 32 of the type with which the usual motor crank is usually provided. The stub shaft may be extended through the usual crank opening below the radiator of the automobile to engage the automobile motor crank shaft so that the stub shaft 30 will rotate with the crank shaft.

On some automobiles, the stub shaft 30 requires no other support than that provided in the automobile for supporting the starting crank. On other types, the stub shaft may be supported by a suitable bearing 33 which can be clamped or otherwise secured to the bumper 11. A V-belt 34 extends between the pulleys 29 and 31.

In use, the automobile is driven across the grasshopper infested area, preferably with the transmission in a lower gear so that the engine of the automobile is turning over at a comparatively rapid speed. This drives the top reach of the belt 23 to the right and, as the car moves, grasshoppers will jump against the back plate 18. This plate being of smooth metal provides no gripping surface so that the grasshoppers fall upon the moving belt 23 and are carried beneath the crushing roller 24. The crushed bodies are returned to the field as the belt rolls over the pulley 21.

In the form of the invention illustrated in Fig. 4, the insects are not crushed upon the belt itself but are thrown from the belt into a chute 35 which directs them between a lower crushing roll 36 and an upper crushing roll 37. The lower crushing roll is driven from the roller shaft 22 through the medium of a suitable chain or belt 38. The upper roll is constantly urged against the lower roll by means of suitable tension springs 39.

The alternate form operates similarly to the previously described form and acts to prevent soiling of the belt 23.

It has been found that the device can be advantageously mounted ahead of a tractor type mowing machine to eliminate the hoppers from the hay or grain before cutting.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A grasshopper exterminator of the type designed to be pushed ahead of a vehicle comprising: a substantially vertical plate; an endless belt conveyor extending horizontally across the bottom of said plate; a crushing roller positioned opposite the delivery extremity of said conveyor to receive the grasshoppers therefrom; a spring pressed roller bearing against said crushing roller; and means for driving said conveyor and said rollers.

2. A grasshopper exterminator of the type designed to be pushed ahead of a vehicle comprising: a substantially vertical plate; an endless belt conveyor extending horizontally across the bottom of said plate; a crushing roller positioned opposite the delivery extremity of said conveyor to receive the grasshoppers therefrom; an inclined plate positioned to convey the hoppers from said conveyor to said crushing roller; a spring pressed roller bearing against said crushing roller to crush the hoppers thereagainst; and means for driving said conveyor and said rollers.

FRED P. NOFFSINGER.
GEORGE H. LOUSTALET.
RALPH L. NOFFSINGER.